Oct. 23, 1928.

H. SIEGRIST 1,689,160

TURNTABLE FOR MOTOR DRIVEN VEHICLES

Filed Aug. 16, 1927   2 Sheets-Sheet 1

Inventor:
H. Siegrist,

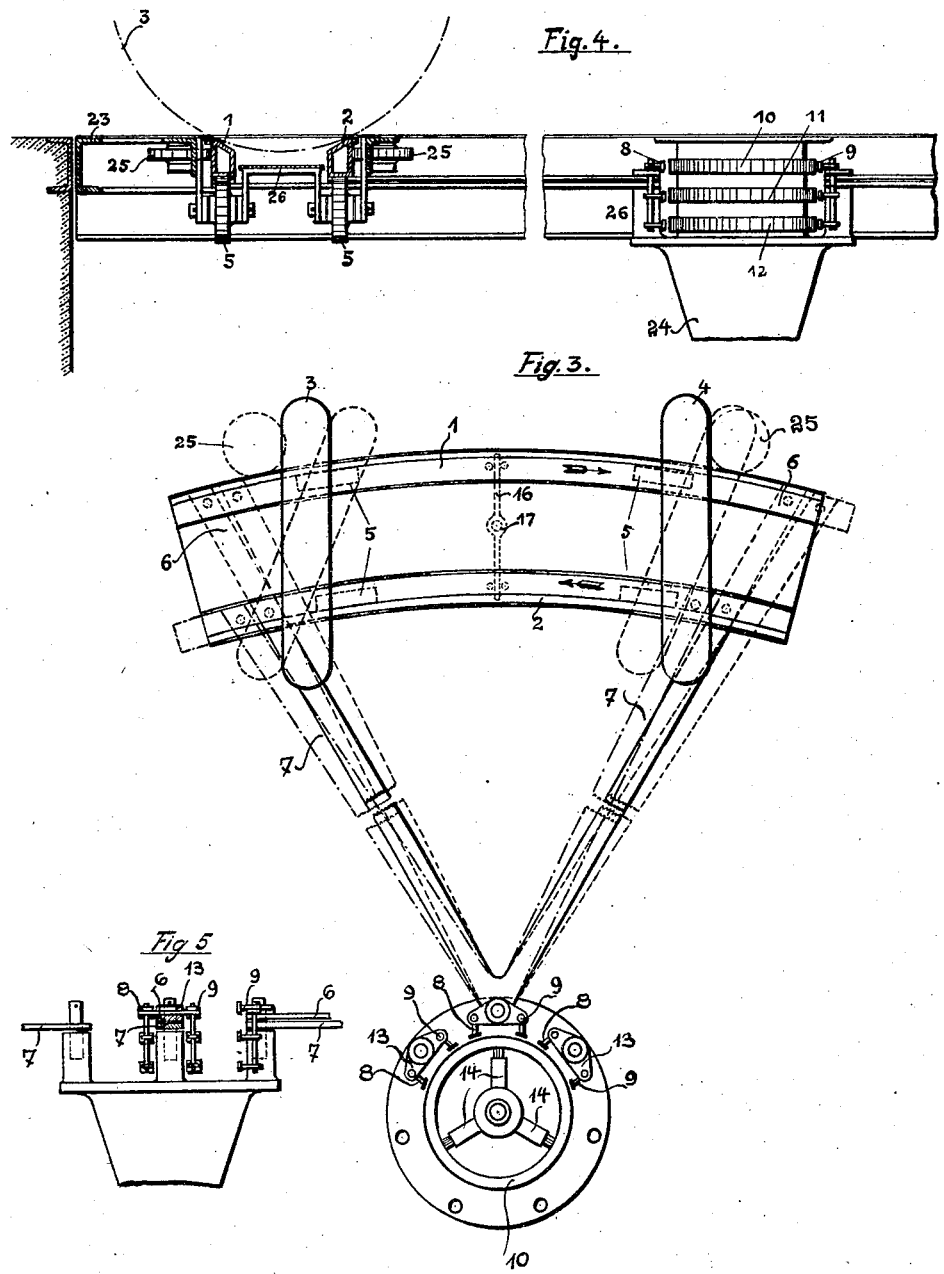

Patented Oct. 23, 1928.

1,689,160

UNITED STATES PATENT OFFICE.

HERMANN SIEGRIST, OF FRANKFORT-ON-THE-MAIN, GERMANY.

TURNTABLE FOR MOTOR-DRIVEN VEHICLES.

Application filed August 16, 1927, Serial No. 213,378, and in Germany August 23, 1926.

This invention relates to a turn-table, driven by electro-motor, for motor driven vehicles and it consists essentially in that the contacts for starting or stopping the motor are operated by the front wheels of the vehicle so that the turn-table can be controlled by means of the steering wheel for the driver's seat.

An embodiment of the invention is illustrated, by way of example, in the accompanying drawing in which—

Fig. 3 shows in top plan view and

Figure 1:
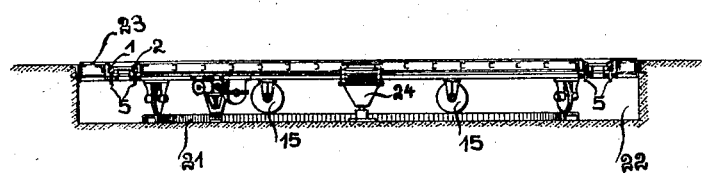
Fig. 1 shows in elevation the turn-table on line A—B of Fig. 2.
Figure 2:
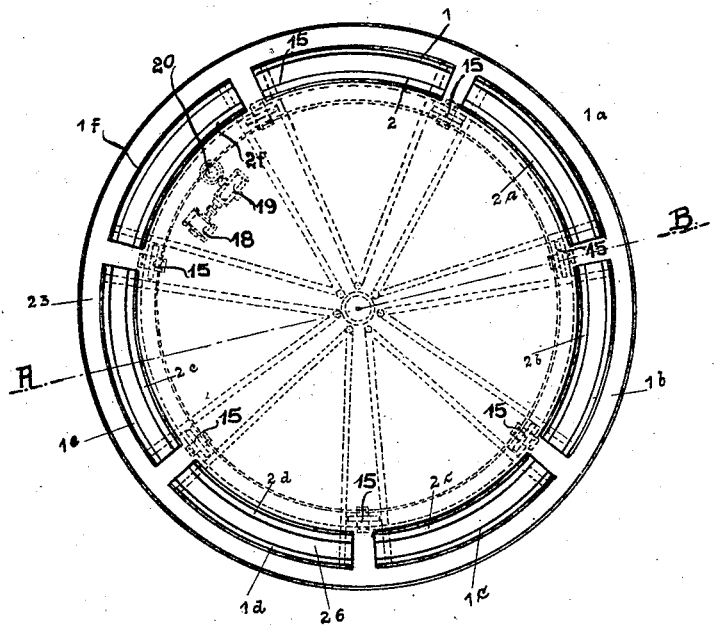
Fig. 2 is a top plan view of Fig. 1.

Fig. 4 in elevation a portion of the turn-table shown in Figs. 1 and 2.

Fig. 5 shows in top plan view the elements arranged at the centre of the turn-table.

The disk 23 of the turn-table rests with rollers 15 on a circular rail. This rail and the turn-table are arranged in a depression 22. A bearing 24 provided on the turn-table engages a vertical stud fixed at the centre of the depression 22. The turn-table is rotated by an electro-motor 18 fixed on the same and which operates a pinion 20 by a gearing down transmission 19 with driving worm. The teeth of the pinion 20 mesh with the teeth of a toothed crown 21.

In apertures of the disk 23 arc-shaped elements, 1, $1^a$, $1^b$, $1^c$, $1^d$, $1^e$, $1^f$ and 2, $2^a$, $2^b$, $2^c$, $2^d$, $2^e$ and $2^f$ are arranged. These arc-shaped elements are shiftable in both longitudinal directions. In order to reduce as much as possible the friction to be overcome at the shifting the elements are supported by rollers 5 and 25 respectively. A bridge 26 connects the rollers 5. The elements 1, $1^a$—$1^e$, $1^f$ are connected by arms 6 with a journal with which the elements 2, $2^a$—$2^e$, $2^f$ are connected by arms 7. The pair of arms 6 of the elements 1, $1^a$—$1^e$, $1^f$ carries a two-armed lever 13, on which are fixed the sets of contact-brushes 8 and 9. Each set of contact-brushes co-operates with three collector-rings 10, 11, 12. The current is supplied to the collector-rings 10, 11 and 12 by brushes 14, and the sets 8 and 9 of contact-brushes are connected to the terminals of the motor 18.

Springs 16 are attached to the arc-shaped elements 1, $1^a$—$1^e$, $1^f$ and to the arc-shaped elements 2, $2^a$—$2^e$, $2^f$ said springs being held each one at the centre by a pin 17.

The operation of the turn-table is as follows:—

A motor-driven vehicle, which is to be turned is run on to the turn-table so that the front-wheels of the vehicle engage each with one of the intervals between elements 1, $1^a$—$1^f$ and the corresponding elements 2, $2^a$—$2^f$. This position of the front-wheels 3, 4 of the motor-car is indicated in Fig. 3. When the front wheels 3 and 4 of the motor-car are oscillated to the right into the position indicated in dash-lines, the element 1 is shifted to the right and the corresponding element 2 is shifted to the left. The arms 6 attached to the element 1 are brought thereby into the position shown in dash-lines, the arms 7 attached to the element 2 being brought into the position indicated in dash and dot-lines. By the oscillating of the arms 7 the brushes of set 9 are brought into contact with the collector-rings 10, 11 and 12 so that the circuit of the motor 18 is closed and the turn-table together with the motor-car is rotated to the right. When the motor car is in the desired position the front wheels 3 and 4 are returned into the normal position from the driver's seat by means of the steering wheel, so that the brushes of set 9 are lifted off the collector-rings 10, 11, 12 and the motor is stopped as the circuit is interrupted. When the motor-car runs off the turn-table with the front-wheels standing still at a certain angle, the elements 1 and 2 are returned into the normal positions by the action of the spring 16 which had been put under tension.

The turning of the motor-car in anticlockwise direction is effected in a similar manner. By turning the wheels 3 and 4, the corresponding elements 1 and 2 are shifted in opposite direction and the set of brushes 8 is brought into contact with the collector-rings 10, 11 and 12 so that the circuit of the motor is closed.

For driving the turn-table continuous current or alternating current motors may be used. When a three-phase-motor is used two phases of the set of brushes 8 have to be interchanged with regard to the set of brushes 9 in order that at the changing of the operated set of brushes 8 and 9 the direction of rotation is reversed.

I claim:—

1. A turn-table for motor driven vehicles, comprising a central journal in a depression, a circular rail in the depression, said rail having teeth, a disk having arc-shaped apertures mounted in a circle said disk being rotatably mounted on said journal and resting with rollers on said circular rail, a pinion on the lower surface of said disk meshing with the teeth of the circular rail, an electro-motor fixed to the lower surface of said disk, a transmission-gear with driving worm for transmitting the rotation of the motor-shaft to said pinion, two circular rows of arc-shaped elements shiftable in said circle of arc-shaped apertures of said disk in both directions the elements of each row being spaced a certain distance apart, arms connecting the elements of one circular row with said journal, arms connecting the elements of the other circular row with said journal, a two-armed lever on the inner end of the arms for each element of the outer row, two sets of contact brushes on each two-armed lever, one set on one end of said lever, said sets of contact brushes being connected to the terminals of the motor, a set of brushes on the inner end of each arm of the elements of the inner circular row, and three collector rings to which current is supplied and arranged in the center of the depression so that when the front-wheels of a motor-car standing on the turn-table are turned from the driver's seat to the one or other direction, the corresponding elements in the two circular rows are shifted in opposite directions so that the circuit of the motor is closed and the turn-table rotated.

2. An electrically driven turn-table for motor and like vehicles operated from the driver's seat of the vehicle, comprising a driving motor for the turn-table, and movable contacts controlling the supply of current to the driving motor the movement of which contacts is effected by rotation of the front wheels of the vehicle operated by the driver thereof by means of the steering wheel.

3. A turn-table as claimed in claim 2, having concentrically arranged ring-like segments adjacent the edge of the turn-table, of which each two associated segments are displaceable in relation to one another in their longitudinal direction, the segments being provided with arms extending towards the centre of the turn-table, said arms being connected at their inner ends with the movable contacts which are moved on displacement of the segments and which cooperate with contact rings located at the centre of the turn-table.

4. An electrically driven turn-table for motor and like vehicles operable from the driver's seat of the vehicle, comprising a driving motor for the turn-table, concentrically arranged pairs of arcuate segments adjacent the periphery of the turn-table, of which each two associated segments of a pair are displaceable in relation to one another in their longitudinal direction, arms on the segments extending radially toward the center of the turn-table, contact rings located at the centre of the turn-table, and movable contacts connected at the inner ends of the arms, said contacts controlling the current to the motor by cooperating with the contact rings on displacement of the segments and the displacement of which segments is effected by rotation of the front wheels of the vehicle operated by the driver thereof by means of the steering wheel.

5. A turn-table as claimed in claim 4, having two pins symmetrically arranged in the centre of the longitudinal axis of each segment and a leaf spring secured to the turn-table the ends of which spring engage between the pins.

In testimony whereof I affix my signature.

HERMANN SIEGRIST.